US012160780B2

(12) United States Patent
Dalsgaard et al.

(10) Patent No.: US 12,160,780 B2
(45) Date of Patent: Dec. 3, 2024

(54) PROVIDING AND USING IMPLICIT PSCells (71) Applicant: Nokia Technologies Oy, Espoo (FI)

(72) Inventors: Lars Dalsgaard, Oulu (FI); Elena Virtej, Espoo (FI); Tero H. M. Henttonen, Espoo (FI); Jarkko T. Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 17/610,378

(22) PCT Filed: May 14, 2020

(86) PCT No.: PCT/IB2020/054588
§ 371 (c)(1),
(2) Date: Nov. 10, 2021

(87) PCT Pub. No.: WO2020/230086
PCT Pub. Date: Nov. 19, 2020

(65) Prior Publication Data
US 2022/0225184 A1 Jul. 14, 2022

Related U.S. Application Data (60) Provisional application No. 62/848,806, filed on May 16, 2019.

(51) Int. Cl.
*H04W 36/00* (2009.01)
*H04W 36/24* (2009.01)
*H04W 36/32* (2009.01)

(52) U.S. Cl.
CPC . *H04W 36/00692* (2023.05); *H04W 36/0058* (2018.08); *H04W 36/0061* (2013.01);
(Continued)

(58) Field of Classification Search
CPC ......... H04W 36/0069; H04W 36/0058; H04W 36/0061; H04W 36/00835;
(Continued)

(56) References Cited

U.S. PATENT DOCUMENTS 10,321,335 B2 * 6/2019 Hwang ................ H04W 88/02
2017/0086089 A1 3/2017 Lee et al.
(Continued)

FOREIGN PATENT DOCUMENTS

CN 102387508 A 3/2012
CN 104067553 A 9/2014
(Continued)

OTHER PUBLICATIONS

Office action received for corresponding Indian Patent Application No. 202147057874, dated Apr. 29, 2022, 6 pages.
(Continued)

*Primary Examiner* — Ricky Q Ngo
*Assistant Examiner* — Kabir U Jahangir
(74) *Attorney, Agent, or Firm* — Barta Jones, PLLC (57) ABSTRACT

A UE in a wireless network determines whether it has been configured with carrier(s) to be used for secondary serving cell carriers in the wireless network. The UE performs, using a selected one of the carrier(s) as a selected secondary serving cell carrier, a request for a cell on the selected secondary serving cell carrier to become a secondary serving cell for the user equipment. The UE receives a response from the cell that the request to have the cell become the secondary serving cell for the user equipment was successful. The request is received on the carrier at a cell in the wireless network to have the cell become the secondary cell for the user equipment. The cell indicates to the UE that the request to have the cell become a secondary cell for the user equipment was successful.

15 Claims, 4 Drawing Sheets (52) U.S. Cl.
CPC ............... *H04W 36/00835* (2018.08); *H04W 36/00837* (2018.08); *H04W 36/249* (2023.05); *H04W 36/322* (2023.05)

(58) Field of Classification Search
CPC ........... H04W 36/00837; H04W 36/32; H04W 36/24; H04W 36/04; H04W 36/16; H04W 36/34
See application file for complete search history.

(56) References Cited

U.S. PATENT DOCUMENTS

| | | | | |
|---|---|---|---|---|
| 2017/0303151 | A1* | 10/2017 | Lunden | H04W 52/0212 |
| 2019/0097690 | A1 | 3/2019 | Kim et al. | |
| 2019/0124685 | A1 | 4/2019 | Rahman et al. | |
| 2019/0150161 | A1* | 5/2019 | Cheng | H04W 72/542 370/330 |
| 2022/0086670 | A1* | 3/2022 | Kim | H04W 76/20 |
| 2022/0095403 | A1* | 3/2022 | Lee | H04L 5/0098 |

FOREIGN PATENT DOCUMENTS

| | | |
|---|---|---|
| CN | 106105333 A | 11/2016 |
| CN | 106576366 A | 4/2017 |
| CN | 107637117 A | 1/2018 |
| WO | 2019/028747 A1 | 2/2019 |

OTHER PUBLICATIONS

Office action received for corresponding European Patent Application No. 20729185.7, dated Oct. 4, 2022, 6 pages.
"Discussion on NR SCell activation delay in FR2", 3GPP TSG-RAN4 Meeting #90bis, R4-1904287, Agenda: 6.10.7.2.2, Nokia, Apr. 8-12, 2019, 6 pages.
"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, 3585 pages.
"3rd Generation Partnership Project; Technical Specification Group Radio Access Network; NR; Requirements for support of radio resource management (Release 15)", 3GPP TS 38.133, V15.5.0, Mar. 2019, 1232 pages.
"WF on Scell Activation Delay in FR2", R4-1904696, Qualcomm, Apr. 15, 2019, 6 pages.
"WF on known cell condition for PSCell FR2", 3GPP TSG-RAN WG4 RAN#90bis, R4-1904845, Agenda: 6.10.7.3.1, Nokia, Apr. 8-12, 2019, 7 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.5.0, Mar. 2019, pp. 1-363.
"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.
International Search Report and Written Opinion received for corresponding Patent Cooperation Treaty Application No. PCT/IB2020/054588, dated Aug. 13, 2020, 16 pages.
"PSCell addition delay in FR2 and Known cell condition for FR2", 3GPP TSG-RAN WG4 Meeting#91, R4-1905937, Agenda: 6.10.7.3.1, Nokia, May 13-17, 2019, 5 pages.
"PSCell addition delay in FR2 36.133 rel-15", 3GPP TSG-RAN WG4 Meeting#91, R4-1905938, Nokia, May 13-17, 2019, 3 pages.
"Discussion on NR PSCell addition delay in FR2", 3GPP TSG-RAN4 Meeting #90bis, R4-1904289, Agenda: 6.10.7.3.1, Nokia, Apr. 8-12, 2019, 5 pages.
"SCell activation delay in FR2 and Known cell condition for FR2", 3GPP TSG-RAN WG4 Meeting#91, R4-1905935, Agenda: 6.10.7.2, Nokia, May 13-17, 2019, 6 pages.
Office Action received for corresponding Chinese Patent Application No. 202080036025.0, dated Jun. 20, 2024, 9 pages of Office Action and no page of translation available.

* cited by examiner

PROVIDING AND USING IMPLICIT PSCells

RELATED APPLICATION

This application claims priority to PCT Application No. PCT/IB2020/054588, filed on May 14, 2020, which claims priority to U.S. Provisional Application No. 62/848,806, filed on May 16, 2019, which is hereby incorporated in its entirety.

TECHNICAL FIELD

This invention relates generally to carrier aggregation and dual connectivity in wireless networks and, more specifically, relates to primary secondary cell (PSCell) interaction in these wireless networks.

BACKGROUND

Abbreviations that may be found in the specification and/or the drawing figures are defined below, at the beginning of the detailed description section.

Carrier Aggregation (CA) allows wireless (e.g., cellular) network operators to combine resources from a number of separate carriers, e.g., each carrier having a different cell. Dual Connectivity (DC) is an improvement on this concept and allows a User Equipment (UE) to simultaneously transmit and receive data on multiple component carriers from two cell groups via a Primary Cell (PCell) in a master cell group (MCG) and potentially one or more secondary cells (SCells), and a secondary cell group (SCG) with a primary secondary cell (PSCell) and potentially one or more Secondary Cells (SCells). There is a Primary Scell (PSCell) in the SCG and (possibly) one or more other SCells, and the PCell and possibly one or other SCells are part of a Master Cell Group (MCG).

In the context of CA/DC or any other dual connectivity form (e.g., MR-DC like EN-DC, NN-DC, and the like) the concept of PCell represents the mobility anchor cell. In other words, this is the cell responsible for Radio Resource Control (RRC) connection (establishment/re-establishment/handover, HO). While in the context of CA, there are SCells (secondary cells) meant for data offloading, in the context of dual connectivity/multi-connectivity at least one SCG has configured Uplink (UL) Component Carrier (CC) and one of them, named the PSCell, is configured with Physical Uplink Control Channel (PUCCH) resources (see 3GPP TS 36.300, and 3GPP TS 38.300 for additional information).

In Long Term Evolution (LTE), it was shown that increased latency concerning configuring and activating SCells has significant impact on the system performance when using CA. For that purpose, a Work Item (WI) was created in 3GPP (third generation partnership project) to address how to reduce the overall latency related to CA in configuring and activating SCells with the goal of increasing the overall system performance when using CA.

During this work (referred to as enhanced utilization of CA-euCA) a number of solutions were defined:
1) early UE measurement reporting;
2) direct SCell activation (for example direct SCell configuration and activation during handover (HO));
3) dormant SCell; and
4) increased channel state information (CSI) reporting.

In New Radio (NR), which is also referred to as 5G (fifth generation), groups are currently working on a similar WI related to dual connectivity and carrier aggregation (DC/CA) enhancements. A focus is on reducing the CA and DC setup latency in order to improve the overall system performance. Among these solutions, the LTE solutions will be assumed as baseline—while other additional solutions need to be considered as well.

NR system design is different from LTE in several ways, of which some impact the possible solutions for decreasing the DC and CA setup latency. In a wider context, a similar approach may be envisioned to any multi-connectivity approach (EN-DC, NE-DC, and the like) as part of 5G or future releases. For example, the NR physical layer will in most cases only provide non-continuous synchronization signals (while in LTE these are continuously transmitted by the network). Additionally, NR includes frequencies in higher frequency ranges (FR2), relative to a frequency range 1 (FR1) that is typically below 6 GHz, in which it is assumed that both base station (gNB) and UE will be using transmission (Tx) and reception (Rx) beams.

This results in possible issues for determining how long a reported cell can be regarded as being valid.

BRIEF SUMMARY

This section is intended to include examples and is not intended to be limiting.

In an exemplary embodiment, a method is disclosed that includes determining, by a user equipment in a wireless network, the user equipment has been configured with one or more carriers to be used for secondary serving cell carriers in the wireless network. The method includes performing, by the user equipment and using a selected one of the one or more carriers as a selected secondary serving cell carrier, a request for a cell on the selected secondary serving cell carrier to become a secondary serving cell for the user equipment. The method also includes receiving by the user equipment a response from the cell that the request to have the cell become the secondary serving cell for the user equipment was successful.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: determining, by a user equipment in a wireless network, the user equipment has been configured with one or more carriers to be used for secondary serving cell carriers in the wireless network; performing, by the user equipment and using a selected one of the one or more carriers as a selected secondary serving cell carrier, a request for a cell on the selected secondary serving cell carrier to become a secondary serving cell for the user equipment; and receiving by the user equipment a response from the cell that the request to have the cell become the secondary serving cell for the user equipment was successful.

An exemplary computer program product includes a computer-readable storage medium bearing computer program code embodied therein for use with a computer. The computer program code includes: code for determining, by a user equipment in a wireless network, the user equipment has been configured with one or more carriers to be used for secondary serving cell carriers in the wireless network; code for performing, by the user equipment and using a selected one of the one or more carriers as a selected secondary serving cell carrier, a request for a cell on the selected secondary serving cell carrier to become a secondary serving cell for the user equipment; and code for receiving by the user equipment a response from the cell that the request to have the cell become the secondary serving cell for the user equipment was successful.

In another exemplary embodiment, an apparatus comprises: means for determining, by a user equipment in a wireless network, the user equipment has been configured with one or more carriers to be used for secondary serving cell carriers in the wireless network; means for performing, by the user equipment and using a selected one of the one or more carriers as a selected secondary serving cell carrier, a request for a cell on the selected secondary serving cell carrier to become a secondary serving cell for the user equipment; and means for receiving by the user equipment a response from the cell that the request to have the cell become the secondary serving cell for the user equipment was successful.

In another exemplary embodiment, a method is disclosed that includes receiving, on a carrier at a cell in a wireless network, request by a user equipment to have the cell become a secondary cell for the user equipment. The method also includes indicating by the cell to the user equipment that the request to have the cell become a secondary cell for the user equipment was successful.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, on a carrier at a cell in a wireless network, request by a user equipment to have the cell become a secondary cell for the user equipment; and indicating by the cell to the user equipment that the request to have the cell become a secondary cell for the user equipment was successful.

An exemplary computer program product includes a computer-readable storage medium bearing computer program code embodied therein for use with a computer. The computer program code includes: code for receiving, on a carrier at a cell in a wireless network, request by a user equipment to have the cell become a secondary cell for the user equipment; and code for indicating by the cell to the user equipment that the request to have the cell become a secondary cell for the user equipment was successful.

In another exemplary embodiment, an apparatus comprises: means for receiving, on a carrier at a cell in a wireless network, request by a user equipment to have the cell become a secondary cell for the user equipment; and means for indicating by the cell to the user equipment that the request to have the cell become a secondary cell for the user equipment was successful.

DETAILED DESCRIPTION OF THE DRAWINGS

The following abbreviations that may be found in the specification and/or the drawing figures are defined as follows:

3GPP third generation partnership project
5G fifth generation
5GC 5G core network
AMF access and mobility management function
BS base station
CA carrier aggregation
CC component carrier
comm. communication
CSI channel state information
CSI-RSRP CSI reference signal received power
CSI-RSRQ CSI reference signal received quality
CSI-SNIR CSI signal-to-interference-plus-noise ratio
CQI channel quality information
CU central unit
DC dual connectivity
DCCA dual connectivity and carrier aggregation
DL downlink (from base station to UE)
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
euCA enhanced utilization of CA
E-UTRA evolved universal terrestrial radio access, i.e., the LTE radio access technology
FR1 frequency range 1 (e.g., below 6 GHz)
FR2 frequency range 2 (e.g., above 6 GHz, such as 24.25 to 52.6 GHz)
FR4 frequency range 4 (e.g., higher than 52 GHz)

gNB (or gNodeB) base station for 5G/NR, i.e., a node providing NR user plane and control plane protocol terminations towards the UE, and connected via the NG interface to the 5GC
HO handover
I/F interface
L1-RSRP layer 1 (physical layer) RSRP
LTE long term evolution
MAC medium access control
MCG master cell group
MME mobility management entity
MO mobile originated
MR-DC multi-radio dual connectivity
MT mobile terminated
ng or NG next generation
ng-eNB or NG-eNB next generation eNB
NN-DC new radio-new radio dual connectivity
NR new radio
N/W or NW network
PCell primary cell
PDCP packet data convergence protocol
PHY physical layer
PRACH physical random access channel
PScell primary secondary cell
RAN radio access network
Rel release
RLC radio link control
RRH remote radio head
RRC radio resource control
RSRP reference signal received power
RSRQ reference signal received quality
RU radio unit
Rx receiver or reception
SCell secondary cell
SCG secondary cell group
SDAP service data adaptation protocol
SGW serving gateway
SMF session management function
SS synchronization signal
SSB synchronization signal block
SS-RSRP SS reference signal received power
SS-RSRQ SS reference signal received quality
SS-SNIR SS signal-to-interference-plus-noise ratio
TS technical specification
Tx transmitter or transmission
UE user equipment (e.g., a wireless, typically mobile device)
UL uplink (from UE to base station)
UPF user plane function
UTRA universal terrestrial radio access
WG working group
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for providing and using implicit PSCells. Additional description of these techniques is presented after a system into which the exemplary embodiments may be used is described.

Figure 1:
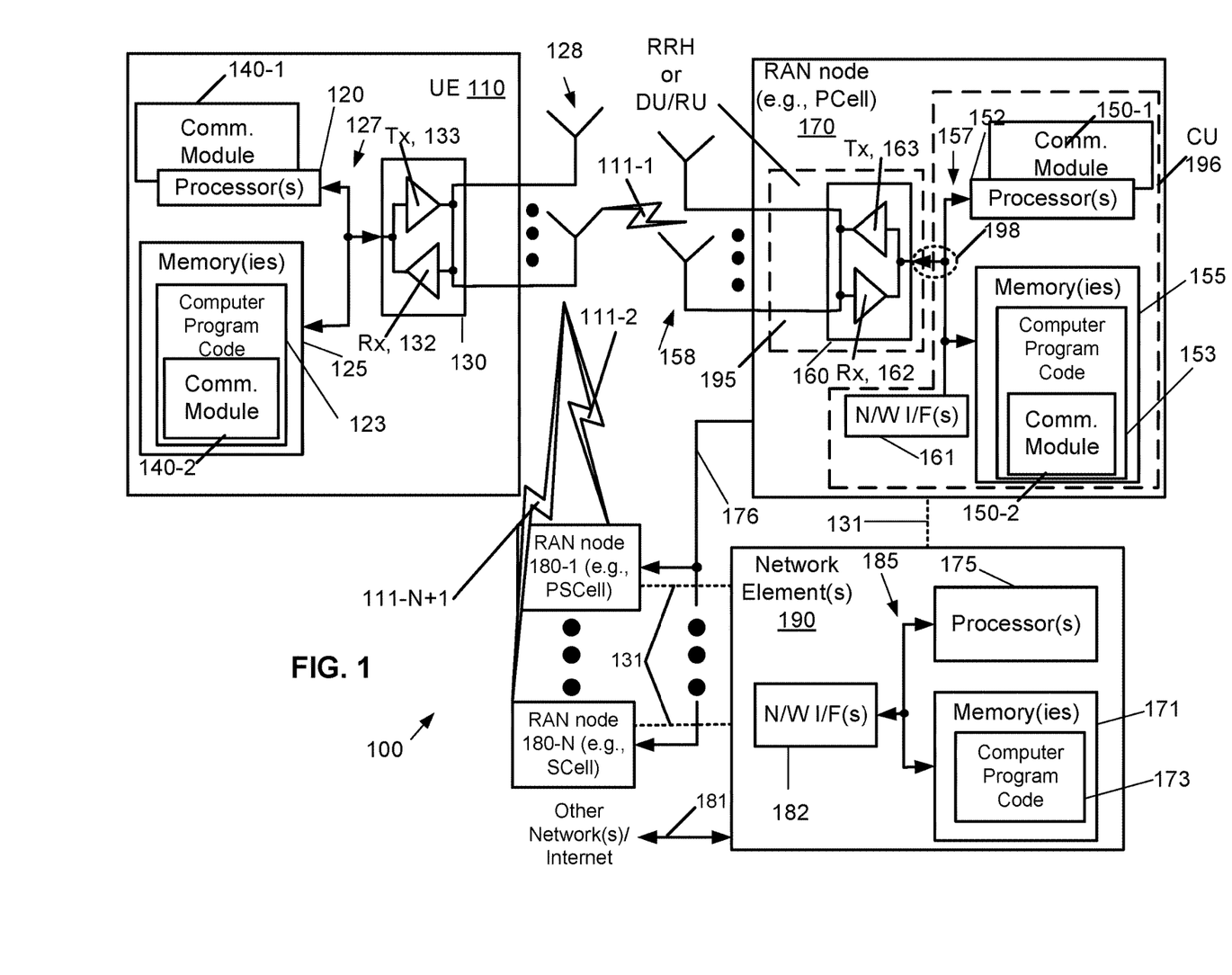
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, multiple radio access network (RAN) nodes 170 ad 180 (e.g., gNBs), and network element(s) 190 are illustrated. There are multiple RAN nodes 170 and 180 illustrated: a first RAN node 170, illustrated as a PCell; a second RAN node 180-1, illustrated as a PSCell; and (possibly) one or more other RAN nodes 180, shown as ellipses and 180-N, which are other SCells. An MCG includes the RAN node 170, the SCell 180-1, and any additional SCells 180-2, . . . , 180-N. An SCG includes the SCell(s) 180. It is noted that there could be a single SCell 180 or multiple SCells 180-1 through 180-N In FIG. 1, a user equipment (UE) 110 is in wireless communication with a wireless (e.g., cellular) network 100. A UE is a wireless, typically mobile device that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a communication (comm) module 140, comprising one of or both parts 140-1 and/or 140-2, which may be implemented in a number of ways. The communication module 140 may be implemented in hardware as communication module 140-1, such as being implemented as part of the one or more processors 120. The communication module 140-1 may be implemented also as an integrated circuit or through other hardware such as a programmable gate array. In another example, the communication module 140 may be implemented as communication module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111-1, RAN node 180-1 via link 111-2, . . . , and RAN node 180-N via link 111-N+1.

The RAN nodes 170 and 180 are base stations that provide access by wireless devices such as the UE 110 to the wireless network 100. The RAN nodes 170 and 180 may be, for instance, base stations for 5G also called New Radio (NR). Although 5G is mainly discussed herein, the RAN node 170 may also be an eNB (evolved NodeB) base station, for LTE (long term evolution), or any other suitable base station. In 5G, each the RAN node 170 or 180 may be an NG-RAN node, which is defined as either a gNB or an ng-eNB. A gNB is a node providing NR user plane and control plane protocol terminations towards the UE, and connected via the NG interface to a 5GC (e.g., the network element(s) 190). For ease of reference herein, the RAN nodes 170 and 180 are mainly described as gNBs, but other nodes are possible. Additionally, possible internal circuitry in the RAN node 170 is described herein, and the other RAN nodes 180-1 through 180-N are assumed to be similar.

The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a communication (comm.) module 150, comprising one of or both parts 150-1 and/or 150-2, which may be implemented in a number of ways. The communication module 150 may be implemented in hardware as communication module 150-1, such as being implemented as part of the one or more processors 152. The communication module 150-1 may be implemented also as an integrated circuit or through other hardware such as a programmable gate array. In another example, the communication module 150 may be implemented as communication module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the communication module 150 may be distributed, such as being distributed between the DU 195 and the CU 196, or be implemented solely in the DU 195.

The one or more network interfaces 161 communicate over a network such as via the links 176 and 131. Two or more RAN nodes 170/180 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN nodes 170/180 are coupled via links 131 to a network element 190. The links 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 182, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN nodes 170/180, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As previously described, NR system design is different from LTE in several ways, of which some impact the possible solutions for decreasing the DC and CA setup latency. For instance, NR includes frequencies in higher frequency ranges (e.g., FR2, although FR4 is also possible), in which it is assumed that both base station (e.g., gNB 170/180) and UE will be using transmission (Tx) and reception (Rx) beams.

In particular, in FR2, it is assumed that both the gNB 170/180 and UE 110 will apply beam forming in order to increase the link budget for increased cell coverage and UE performance. This is seen as being necessary due to the increased path losses in higher carrier frequencies.

Figure 2:
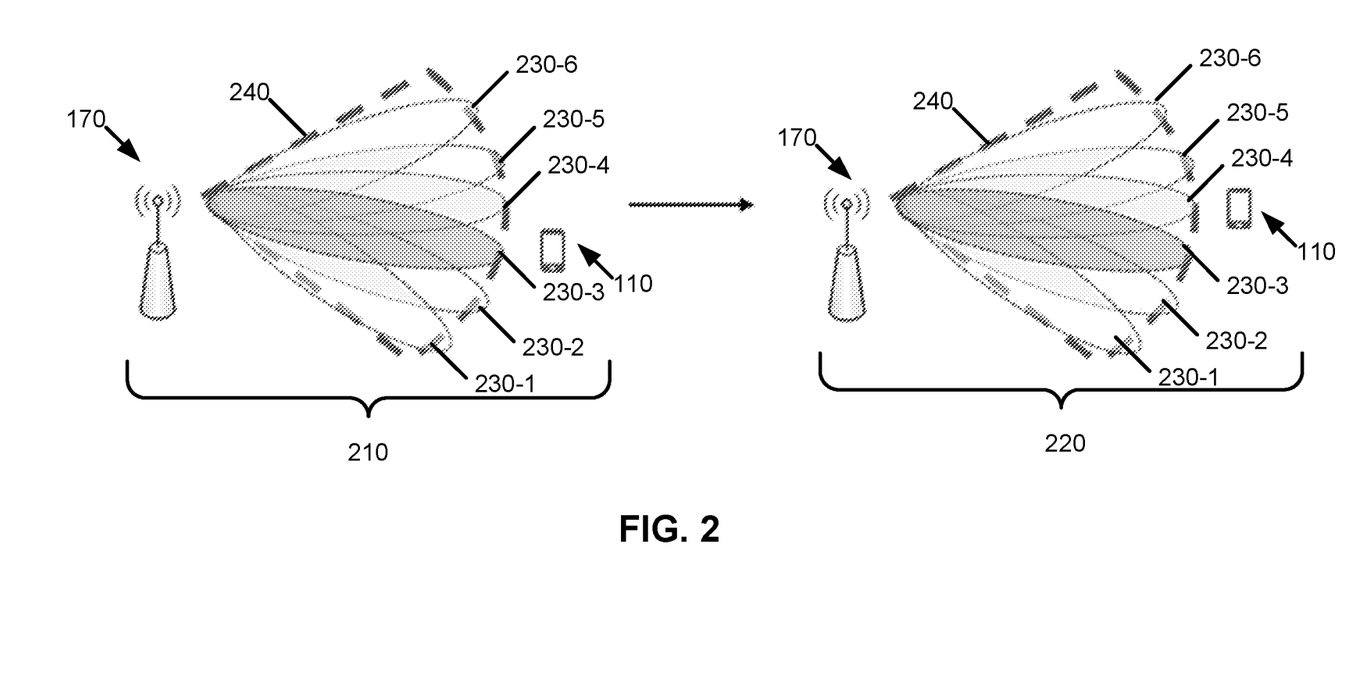
FIG. 2 is an illustration where a Tx beam is changed due to UE movement.

One figure illustrating the aspect of gNB Tx beam forming is illustrated in FIG. 2, which is from R4-1904287, Nokia, Nokia Shanghai Bell, "Discussion on NR SCell activation delay in FR2", 3GPP TSG-RAN4 Meeting #90bis, Xi'an, China, 8-12 Apr. 2019. FIG. 2 is an illustration where a Tx beam is changed due to UE movement. A gNB 170 is shown creating six beams 230-1 through 230-6 within a cell 240. In this example, reference 210 indicates an initial location, where the UE 110 is in the coverage zone of beam 230-3. The UE 110 has the information of this beam 230-3 and the cell 240. The UE 110 moves to another location illustrated by reference 220, and the UE 110 is out of the coverage of the beam 230-3, but the UE 110 is still in the coverage of the beam 230-4 of the same cell 240.

Depending on the network deployment and carrier frequency used, the basic coverage area of a DL beam 230 may be rather limited. This means that if the UE 110 moves as illustrated in FIG. 2, the UE will enter the coverage of another DL beam 230. This is similar for the UE's Rx beam (not shown) where, e.g., a movement, e.g., due to rotation and the like may lead to a need to change of the Rx beam when receiving a given DL beam from the gNB.

As can be recognized, such UE movements, which lead to change in either Tx beam and/or Rx beam, increase the connection uncertainty between UE 110 and network 100 in terms of when a given Tx/Rx beam set can be assumed to be valid (over time).

The beam forming aspect has led to long discussions in 3GPP and especially in WG4 (working group 4, responsible for the development of specifications dealing with UTRA, Evolved UTRA, and beyond) related to assumed interruptions at HO, SCell activation delay and PSCell additions delay.

The very basic problem under discussion is the following question: for how long a time can a detected measured and reported cell be regarded as being valid, assuming that the Rx/Tx beam pair has not changed?

When looking at utilization of cells in FR2 or in general cells above 6 GHz (e.g., such as in FR4), one important scenario use case for NR is the use of NR FR2 carriers together with PCell in FR1, either using LTE or NR. One such example would be when the PCell is in FR1 and the PSCell is in FR2. In legacy (and FR1), when adding a PSCell, this addition is predictable assuming that the network configures the PSCell rather soon after the UE has reported a potential PSCell (See 3GPP TS 36.133 and TS 38.133). However, as explained above, when the added PSCell is in FR2 or otherwise above 6 GHz, it becomes very difficult to define and/or predict the latency related to PSCell addition. Especially when the UE is moving and/or in changing environments (for example due to high beam granularity, any small movement of UE or device could cause significant fluctuations on signal quality), the latency when adding a PSCell and until the PSCell can be used for scheduling increases and will in most situations become unpredictable.

This increase in latency (together with the uncertainty whether the reported beam is still valid) decreases the system performance and efficiency in terms of utilizing a possible FR2 or otherwise above 6 GHz cell as a PSCell for offloading. That is, a method is needed that provides improving the visibility and predictability as to when a PSCell is ready for use and therefore decreasing the PSCell addition time.

To this end, in an exemplary embodiment, a method is proposed where the UE is configured with a 'PSCell carrier'. A PSCell carrier means that any cell detected on that PSCell carrier is or can be assumed to be a potential PSCell.

The method may additionally include that if the UE has detected a cell on the PSCell carrier which is 'good enough' (e.g., meets predefined condition(s)) and (depending on scenario) data transmission is ongoing (e.g., or is about to start within a time period or starts or is initiated), the UE will (e.g., in addition to performing access on the PCell) perform access on the cell (e.g., formed by the gNB 180-1) on the PSCell carrier—i.e., on the potential 'PSCell'.

Once or if the network 100 receives an access request from the UE on a cell (e.g., formed by the gNB 180-1 for the PSCell) on the 'PSCell carrier', the network can choose to accept usage of the cell as a PSCell, e.g., by responding to the UE access request on the accessed cell (the potential 'PSCell') by responding to the access request (e.g., random access response). This could, e.g., use normal PRACH procedure. By responding to the UE access request, the network 100 thereby acknowledges that the cell will be used as PSCell.

The network 100 (e.g., the gNB 180-1) is still the controlling entity of adding a PSCell and necessary parameters. At the same, the latency in adding a PSCell is significantly reduced due to reduction in signaling overhead and PSCell configuration time.

One illustrative example is now provided for how the method could be realized in NR. This is one non-limiting example using a PCell in FR1 (e.g., LTE or NR PCell) and assuming that the PSCell carrier is a carrier in FR2. However, other combinations are not excluded. Signaling flow is one illustrative example and other access methods such as, e.g., the PRACH procedure can be used as well.

Figure 3:
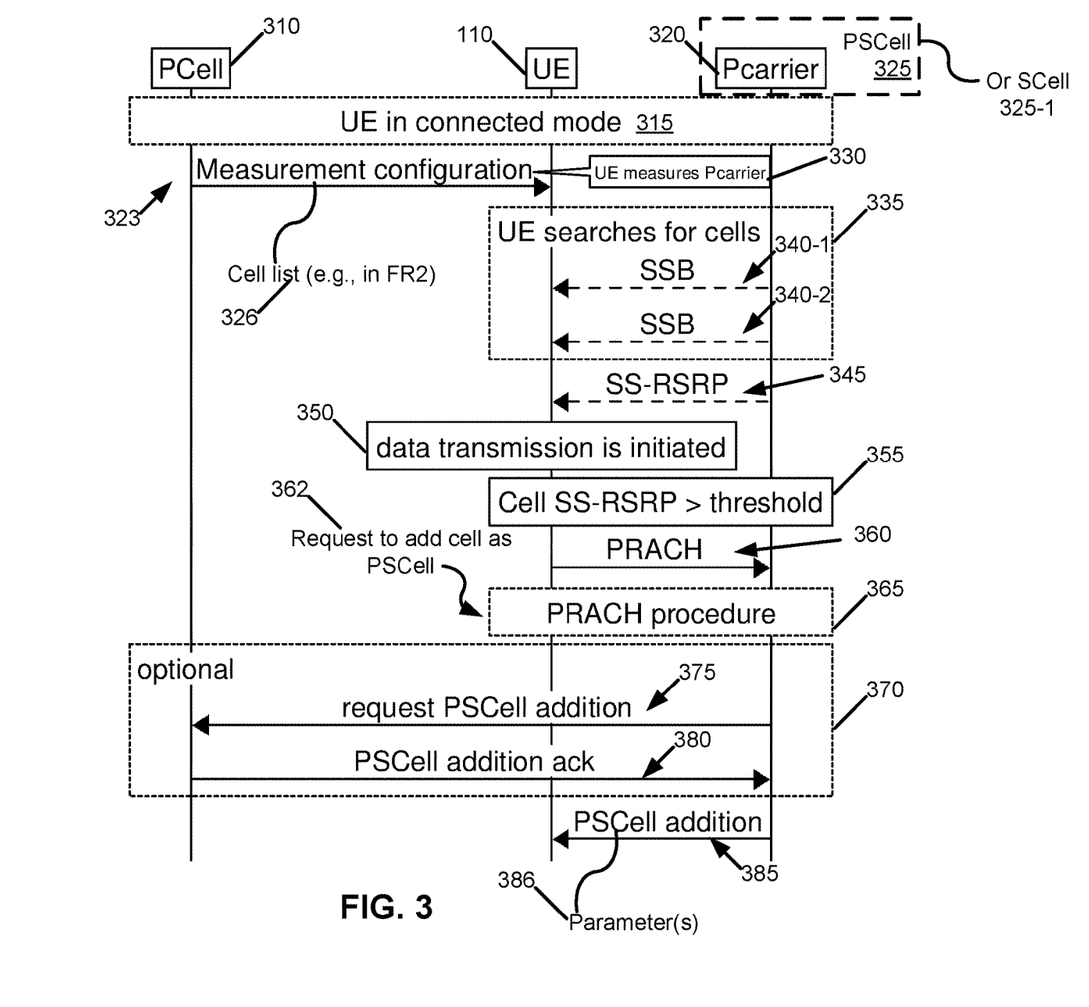
FIG. 3 is a signaling diagram for a method for providing and using implicit PSCells, in accordance with an exemplary embodiment.

This example uses FIG. 3, which is a signaling diagram for a method for providing and using implicit PSCells, in accordance with an exemplary embodiment. The PCell 310 is formed by the gNB 170, and the Pcarrier 320 is broadcast or signaled by the gNB 180-1 (e.g., creating a PSCell 325 if this cell is added as such). Each of the gNBs 170/180 is assumed to be controlled in part by its corresponding communication module 150.

In this example, the UE 110 is in connected mode in block 315. The network 100 (e.g., the gNB 170, PCell 310) configures the UE to perform inter-frequency measurements on a carrier, e.g., in FR2, which is intended to be used for example in an EN-DC configuration for offloading. See signaling 323. That is, the cells on the carrier in FR2 and, potentially within a cell list 326, are intended to be used as PSCells. This list 326 of cells could also be empty to indicate any cell is suitable for PSCell (e.g., in case of large CU encompassing multiple DUs).

The UE 110 will perform inter-frequency measurements on the carrier (Pcarrier) in block 330. In one example, the UE would not be configured with any reporting criteria for the carrier and, e.g., the UE 110 will not trigger any measurement reporting on the PCell due to measurements on this FR2 carrier. In another example, the UE is configured such that the measurement configuration includes information enabling the UE to identify the carrier as a 'PSCell carrier' type.

In block 335, the UE searches for cells, e.g., by receiving SSBs 340-1 and 340-2. In block 345, the UE can make one or more RSRP measurements using the physical signal of e.g. SS reference signal received power (SS-RSRP). Note that RSRP is merely one exemplary measurement that might be made.

Once data traffic is initiated (e.g., or if data traffic is ongoing) (see block 350), in certain embodiments, and a cell on the FR2 PSCell carrier (Pcarrier 320) is evaluated as being "good enough" (e.g., per some criterion/criteria, for example RSRP/RSRQ or similar measurement(s) is/are over a threshold or thresholds), the UE will initiate an access procedure on the FR2 cell on the PSCell carrier 320. When the UE 110 is caused to perform an access procedure on the cell on the PSCell carrier 320 may have multiple conditions, but at least one of them is fulfilled, such as the following:
1) A measurement from the cell is better than a given threshold;
2) The cell is detectable and the cell identity belongs to the list of indicated cell identities indicated by network (e.g., the list 326);
3) On request by network (e.g., from PCell 310); and/or
4) If a data buffer (UE or network side) exceeds a certain threshold.

The measurement may include for NR any one or more of the following: SS-RSRP, SS-RSRQ, CSI-RSRP, CSI-RSRQ, SS-SNIR, CSI-SNIR, L1-RSRP, and the like. For LTE, these could include, as examples, RSRP, RSRQ, CSI, CQI, CSI-RSRP, RS-SNIR, RSSI, NR-SS-RSRP, NR-SS-RSRQ, and the like.

Note that the UE may have data transmission that is initiated (or scheduled, e.g., triggered, to be initiated), and this might apply to the case where a data buffer in the UE exceeds a threshold (i.e., the UE has some traffic and thus could use a PSCell).

If initiated by wireless network (see (3)), then this can be regardless of traffic. That is, the network (e.g., the PCell) requests this when more capacity is needed. Therefore, the UE, since the UE can determine which cell is the strongest cell at the moment, can select the cell—as long as the cell fulfills the conditions set by the network. It is noted that this is different from the current way LTE/NR works, where the network configures a specific cell for the UE. This means waiting for measurement reports from the UE so that the network can know which cell the network should configure.

Regarding (1) and (2) above, one possible approach is to configure a cell as PSCell when needed (i.e., when traffic comes either MO/MT). In other words, in response to data traffic being initiated (or is ongoing or is scheduled, e.g., triggered, to start, e.g., within a time period or immediately), the UE could perform (1) or (2). This limitation makes sense when the UE autonomously adds the cell, though is not absolutely necessary. When the network initiates the procedure, however, the network could do so also before the traffic itself is initiated, though the network might not unless the network somehow anticipates need. Anticipation is possible but the network might not be configured for this.

If one or more conditions are fulfilled (in the example of FIG. 3, cell SS-RSRP is greater than a threshold in block 355), and the UE performs access on the FR2 cell on the PSCell carrier 320, the network may reply to the request and thereby acknowledge that the cell will be used, e.g., as PSCell 325. In one example, the UE initiates a request for access via signaling 360 on the cell and uses the PRACH procedure 365. It is noted the UE may signal that it wants to add a PSCell during the random access procedure. For instance, instead of requesting RRC connection setup, the UE 110 requests (reference 362) adding the cell as a PSCell, for example in Msg 3 the UE may send a request to add the cell as PSCell. As is known, Msg 3 is the third message in the random access procedure (after preamble transmission and random access response), and this message could typically be, e.g., the RRC setup request message. One could either send a new message requesting set up of PSCell, or a modified version of some existing message carrying this new request. Note that this is performed differently from the current situation, where the PSCell is configured by the PCell, typically based on measurement reports from UE. In the example of FIG. 3, by contrast, the UE is requesting the cell on the Pcarrier 320 to become the PSCell for the UE. If the UE receives a response to the access, which could be in the PRACH procedure or the signaling 385 described below, the UE can assume that the cell will be used as PSCell 325 and act accordingly.

If the network (e.g., gNB 180-1) wants to use the indicated cell on the PSCell carrier 320 as a PSCell 325, the network responds to the UE access request. Otherwise, the network in one example does not respond to the request or in another example rejects the UE access request. Once the network has acknowledged to use the cell as PSCell 325, the network configures the UE with any necessary missing parameters (e.g., see signaling 385 and parameter(s) 386) for the PSCell. These parameters, such as common RRC configuration, dedicated RRC configuration, PHY configuration parameters, MAC configuration for SCell, STAG configuration, and the like, will enable UE to access the PSCell. In one example, the UE can assume to receive the missing parameters from the acknowledged PSCell 325 on the PSCell carrier 320, as illustrated in FIG. 3. However, it is also possible to receive the parameter(s) via the PCell 310.

As optional signaling in block 370, the PSCell 325 on the Pcarrier 320 may send a request PSCell addition message in signaling 375, and the PCell 310 responds in signaling 380 with a PSCell addition acknowledgement (ack). It is noted that FIG. 3 assumes the PSCell addition is accepted by the PCell 310. Another possibility is that the PSCell addition is rejected, e.g., the UE's configuration could have become obsolete and the reconfiguration was not yet performed. In such case, the procedure would be stopped at some point and the UE would be signaled that the request was rejected.

Once the PSCell is added, then e.g. DC operations may be performed by the PCell 310, UE 110, and PSCell 325. Such DC operations are known.

In another example, the UE could be configured before the UE transitions to an idle/inactive state with a list of cells/carriers to measure while in the inactive/idle state. Later, upon connection setup (e.g., transitioning the UE into connected mode with the PCell), the UE would use these measured cells while in the idle/inactive state for (P)SCell quick set up. In this case, the UE would be indicated that those cells can be added as implicit (e.g., virtual) PSCells, i.e., without explicit network configuration but based on a UE-initiated request.

While FIG. 3 is directed to adding a PSCell 325, FIG. 3 may also be implemented to add an SCell 325-1. This might occur if there is already a PSCell 325, and the UE wants to add another SCell, for instance.

Exemplary advantages and technical effects include one or more of the following:
1) there is no need for reporting potential PSCells on PCell;
2) the exemplary embodiments remove the uncertainty of latency by getting reporting only when PSCell use is needed;
3) the exemplary embodiments reduce the need for having PSCell added for unnecessarily long time;
4) the exemplary embodiments lower UE and network complexity; and/or
5) the exemplary embodiments require potentially less UE measurement effort.

Figure 4:
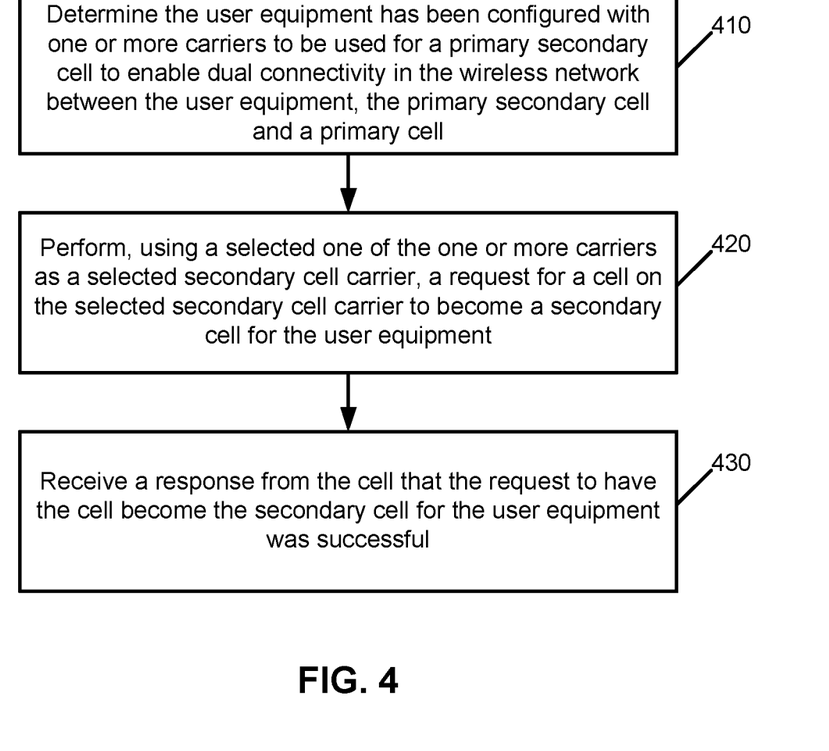
FIG. 4 is a logic flow diagram performed by a UE for providing and using implicit PSCells, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 4, this figure is a logic flow diagram performed by a UE 110 for providing and using implicit PSCells. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 4 are assumed to be performed by the UE 110, e.g., under control of the communication module 140.

The flow in FIG. 4 starts in block 410, where the UE 110 determines the user equipment has been configured with one or more carriers to be used for secondary cell carriers in the wireless network. In block 420, the user equipment performs, using a selected one of the one or more carriers as a selected secondary cell carrier, a request for a cell on the selected secondary cell carrier to become a secondary cell for the user equipment. The user equipment receives a response from the cell that the request to have the cell become the secondary cell for the user equipment was successful. This occurs in block 430.

The following are additional examples based on FIG. 4, which is referred to as example 1.

Example 2. The method of example 1, further comprising detecting by the user equipment the cell meets one or more predefined conditions and wherein the performing the request for the cell to become a secondary cell is performed responsive to the detection the cell meets the one or more predefined conditions.

Example 3. The method of example 2, wherein detecting the cell meets one or more predefined conditions is performed in response to a current data transmission from the user equipment to the primary cell being an ongoing transmission or being previously initiated or started but not yet ongoing or being scheduled or triggered to start within a time period or immediately.

Example 4. The method of any of examples 2 or 3, wherein the detecting the cell meets one or more predefined conditions comprises determining a measurement from the cell is better than a given threshold.

Example 5. The method of example 4, wherein the user equipment is configured before the user equipment transitions to an idle/inactive state with a list of carriers to measure while in the inactive/idle state, and wherein the method further comprises the user equipment measuring the carriers in the list while the user equipment is in the inactive/idle state and using those measurements, for the performing the request for the cell, in response to transitioning to a connected mode with a primary cell in the wireless network.

Example 6. The method of any of examples 4 or 5, wherein the measurement comprises one of the following: SS-RSRP, SS-RSRQ, CSI-RSRP, CSI-RSRQ, SS-SNIR, CSI-SNIR, L1-RSRP, RSRP, RSRQ, CSI, CQI, CSI-RSRP, RS-SNIR, RSSI, NR-SS-RSRP, NR-SS-RSRQ.

Example 7. The method of any of examples 2 or 3, wherein the detecting the cell meets one or more predefined conditions comprises determining the cell is detectable and a cell identity of the cell belongs to a list of cell identities indicated by wireless network to the user equipment.

Example 8. The method of example 1, further comprising receiving a request by wireless network to perform a request for the user equipment to add any secondary cell as a secondary cell for the user equipment, and wherein the performing the request for the cell to become the secondary cell is performed responsive to the request by the wireless network.

Example 9. The method of example 1, further comprising determining whether a data buffer in the user equipment exceeds a first threshold or determining that the wireless network has indicated to the user equipment that a data buffer at the wireless network has exceeded a second threshold, and wherein the performing the request for the cell to become a secondary cell is performed responsive to a determination the data buffer in the user equipment exceeds the first threshold or a determination that the wireless network has indicated to the user equipment that the data buffer at the wireless network has exceeded the second threshold.

Example 10. The method of example 9, wherein determining whether a data buffer in the user equipment exceeds a first threshold is performed in response to a current data transmission from the user equipment to a primary cell being an ongoing transmission or being previously initiated or started but not yet ongoing or being scheduled or triggered to start within a time period or immediately.

Example 11. The method of any of examples 1 to 10, wherein the response from the cell uses one of a physical random access channel procedure or signaling occurring after completion of the physical random access channel procedure.

Example 12. The method of any of examples 1 to 11, wherein the secondary cell is a primary secondary cell and the request for the cell to become a secondary cell for the user equipment is a request for the cell to become the primary secondary cell for the user equipment.

Example 13. The method of any of examples 1 to 12, wherein the request for the cell to become a secondary serving cell for the user equipment is used to allow the user equipment to participate in dual connectivity or carrier aggregation in the wireless network between the user equipment, at least one secondary cell and a primary cell.

Example 14. The method of any of examples 1 to 13, wherein the performing the request for the cell to become the secondary cell for the user equipment is performed using at least an access procedure to the cell.

Example 15. The method of any of examples 1 to 14, further comprising using, in response to the receiving the response from the cell that the request to have the cell become the secondary cell for the user equipment was successful, by the user equipment the cell as a secondary cell for the user equipment in dual connectivity or carrier aggregation.

Example 16. The method of any of examples 1 to 15, wherein the one or more carriers are above 6 GHz.

Example 17. The method of example 16, wherein a primary cell to which the user equipment is connected operates on a carrier below 6 GHz.

Figure 5:
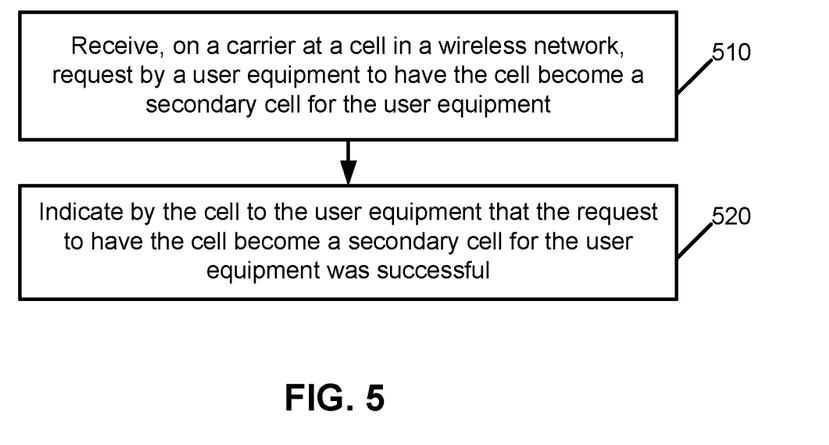
FIG. 5 is a logic flow diagram performed by a cell for providing and using implicit PSCells, and illustrates the operation of an exemplary method or methods, a result of execution of computer program instructions embodied on a computer readable memory, functions performed by logic implemented in hardware, and/or interconnected means for performing functions in accordance with exemplary embodiments.

Referring to FIG. 5, this figure is a logic flow diagram performed by a cell for providing and using implicit PSCells (or SCells). FIG. 5 illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 5 are assumed to be performed by the cell 325 (as generated by the gNB 180 and to become a PSCell), e.g., under control of the communication module 150.

In block 510, the gNB/cell 325 receives, on a carrier at a cell in a wireless network, request by a user equipment to have the cell become a secondary cell for the user equipment. In block 520, the gNB/cell 325 indicates by the cell to the user equipment that the request to have the cell become a secondary cell for the user equipment was successful.

The following are additional examples based on FIG. 5, which is referred to as example 18.

Example 19. The method of example 18, further comprising performing, in response to the receiving and indicating, one or more actions to act as the secondary cell for the user equipment.

Example 20. The method of example 18, wherein the performing one or more actions further comprises:

sending by the cell a request for a secondary cell addition to a primary cell in the wireless network; and in response to receiving a primary secondary cell addition acknowledgement from the primary cell, performing the acting as the secondary cell for the user equipment.

Example 21. The method of any of examples 19 or 20, wherein performing one or more actions further comprises sending by the cell one or more parameters for the secondary cell to the user equipment, the one or more parameters enabling the user equipment to access the secondary cell.

Example 22. The method of any of examples 18 to 21, wherein the carrier is above 6 GHz.

Example 23. The method of any of examples 18 to 22, wherein the receiving the request occurs in a physical random access channel procedure and the indicating to the user equipment occurs in one of a physical random access channel procedure or signaling occurring after completion of the physical random access channel procedure.

Example 24. The method of any of examples 18 to 23, wherein the secondary cell is a primary secondary cell and the request by the user equipment for the cell to become a secondary cell for the user equipment is a request for the cell to become the primary secondary cell for the user equipment.

Additional examples are as follows.

Example 25. A computer program, comprising code for performing the methods of any of examples 1 to 24, when the computer program is run on a computer.

Example 26. The computer program according to example 25, wherein the computer program is a computer program product comprising a computer-readable medium bearing computer program code embodied therein for use with the computer.

Example 27. The computer program according to example 25, wherein the computer program is directly loadable into an internal memory of the computer.

Example 28. An apparatus, comprising:
means for determining, by a user equipment in a wireless network, the user equipment has been configured with one or more carriers to be used for secondary cell carriers in the wireless network;
means for performing, by the user equipment and using a selected one of the one or more carriers as a selected secondary cell carrier, a request for a cell on the selected secondary cell carrier to become a secondary cell for the user equipment; and
means for receiving by the user equipment a response from the cell that the request to have the cell become the secondary cell for the user equipment was successful.

Example 29. The apparatus of example 28, further comprising means for performing the method of any of examples 2 to 17.

Example 30. A user equipment comprising the apparatus of any of examples 28 or 29.

Example 31. An apparatus, comprising:
means for receiving, on a carrier at a cell in a wireless network, request by a user equipment to have the cell become a secondary cell for the user equipment; and
means for indicating by the cell to the user equipment that the request to have the cell become a secondary cell for the user equipment was successful.

Example 32. The apparatus of example 31, further comprising means for performing the method of any of examples 19 to 24.

Example 33. A base station comprising the apparatus of any of examples 31 or 32.

Example 34. A wireless communication system comprising an apparatus according to any of examples 28 or 29 and an apparatus according to any of examples 31 or 32.

Example 35. An apparatus, comprising:
at least one processor; and
at least one memory including computer program code,
the at least one memory and the computer program code configured, with the at least one processor, to cause the apparatus to perform operations comprising:
determining, by a user equipment in a wireless network, the user equipment has been configured with one or more carriers to be used for secondary cell carriers in the wireless network;
performing, by the user equipment and using a selected one of the one or more carriers as a selected secondary cell carrier, a request for a cell on the selected secondary cell carrier to become a secondary cell for the user equipment; and receiving by the user equipment a response from the cell that the request to have the cell become the secondary cell for the user equipment was successful.

Example 36. An apparatus, comprising:

at least one processor; and at least one memory including computer program code, the at least one memory and the computer program code configured, with the at least one processor, to cause the apparatus to perform operations comprising:

receiving, on a carrier at a cell in a wireless network, request by a user equipment to have the cell become a secondary cell for the user equipment; and indicating by the cell to the user equipment that the request to have the cell become a secondary cell for the user equipment was successful.

Example 37. A computer program product comprising a computer-readable storage medium bearing computer program code embodied therein for use with a computer, the computer program code comprising:

code for determining, by a user equipment in a wireless network, the user equipment has been configured with one or more carriers to be used for secondary cell carriers in the wireless network;

code for performing, by the user equipment and using a selected one of the one or more carriers as a selected secondary cell carrier, a request for a cell on the selected secondary cell carrier to become a secondary cell for the user equipment; and code for receiving by the user equipment a response from the cell that the request to have the cell become the secondary cell for the user equipment was successful.

Example 38. A computer program product comprising a computer-readable storage medium bearing computer program code embodied therein for use with a computer, the computer program code comprising:

code for receiving, on a carrier at a cell in a wireless network, request by a user equipment to have the cell become a secondary cell for the user equipment; and code for indicating by the cell to the user equipment that the request to have the cell become a secondary cell for the user equipment was successful.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:

determining, by a user equipment in a wireless network, the user equipment has been configured with one or more carriers to be used for secondary serving cell carriers in the wireless network;

performing, by the user equipment and using a selected one of the one or more carriers as a selected secondary serving cell carrier, a request for a cell on the selected secondary serving cell carrier to become a secondary serving cell for the user equipment;

determining whether a data buffer in the user equipment exceeds a first threshold or determining that the wireless network has indicated to the user equipment that a data buffer at the wireless network has exceeded a second threshold, wherein the performing the request for the cell to become the secondary serving cell is performed responsive to the determination the data buffer in the user equipment exceeds the first threshold or the determination that the wireless network has indicated to the user equipment that the data buffer at the wireless network has exceeded the second threshold, and wherein determining whether the data buffer in the user equipment exceeds the first threshold is performed in response to a current data transmission from the user equipment to a primary cell being an ongoing transmission or being previously initiated or started but not yet ongoing or being scheduled or triggered to start within a time period or immediately; and receiving by the user equipment a response from the cell that the request to have the cell become the secondary serving cell for the user equipment was successful.

2. The method of claim 1, further comprising detecting by the user equipment the cell meets one or more predefined conditions and wherein the performing the request for the cell to become a secondary serving cell is performed responsive to the detection the cell meets the one or more predefined conditions.

3. The method of claim 2, wherein the detecting the cell meets one or more predefined conditions is performed in response to a current data transmission from the user equipment to the primary cell being an ongoing transmission or being previously initiated or started but not yet ongoing or being scheduled or triggered to start within a time period or immediately.

4. The method of claim 2, wherein the user equipment is configured before the user equipment transitions to an idle/inactive state with a list of carriers to measure while in the inactive/idle state, and wherein the method further comprises the user equipment measuring the carriers in the list while the user equipment is in the inactive/idle state and using those measurements, for the performing the request for the cell, in response to transitioning to a connected mode with the primary cell in the wireless network.

5. The method of claim 2, wherein the detecting the cell meets one or more predefined conditions comprises determining the cell is detectable and a cell identity of the cell belongs to a list of cell identities indicated by wireless network to the user equipment.

6. The method of claim 1, further comprising receiving a request by wireless network to perform a request for the user equipment to add any secondary cell as the secondary serving cell for the user equipment, and wherein the performing the request for the cell to become the secondary serving cell is performed responsive to the request by the wireless network.

7. The method of claim 1, wherein the secondary cell is a primary secondary cell and the request for the cell to become a secondary serving cell for the user equipment is a request for the cell to become the primary secondary serving cell for the user equipment.

8. The method of claim 1, wherein the request for the cell to become a secondary serving cell for the user equipment is used to allow the user equipment to participate in dual connectivity or carrier aggregation in the wireless network between the user equipment, at least one secondary cell and the primary cell.

9. A method, comprising:
receiving, on a carrier at a cell in a wireless network, request by a user equipment to have the cell become a secondary cell for the user equipment;
performing, in response to the receiving and indicating, one or more actions to act as the secondary cell for the user equipment, wherein the one or more actions comprises:
  sending by the cell a request for a secondary cell addition to a primary cell in the wireless network;
  in response to receiving a primary secondary cell addition acknowledgement from the primary cell, performing the acting as the secondary cell for the user equipment; and
  sending by the cell one or more parameters for the secondary cell to the user equipment, the one or more parameters enabling the user equipment to access the secondary cell, wherein the parameters comprises at least one of common Radio Resource Control (RRC) configuration, dedicated RRC configuration, physical layer configuration, and Medium Access Control (MAC) configuration for the secondary cell; and
indicating by the cell to the user equipment that the request to have the cell become a secondary cell for the user equipment was successful.

10. The method of claim 9, wherein the secondary cell is a primary secondary cell and the request by the user equipment for the cell to become a secondary cell for the user equipment is a request for the cell to become the primary secondary cell for the user equipment.

11. An apparatus configured as user equipment, the apparatus, comprising:
at least one processor; and
at least one memory including computer program code,
the at least one memory and the computer program code configured, with the at least one processor, to cause the apparatus to perform operations comprising:
determining, by the user equipment in a wireless network, the user equipment has been configured with one or more carriers to be used for secondary cell carriers in the wireless network;
performing, by the user equipment and using a selected one of the one or more carriers as a selected secondary cell carrier, a request for a cell on the selected secondary cell carrier to become a secondary cell for the user equipment;
determining whether a data buffer in the user equipment exceeds a first threshold or determining that the wireless network has indicated to the user equipment that a data buffer at the wireless network has exceeded a second threshold,
wherein the performing the request for the cell to become the secondary cell is performed responsive to a determination the data buffer in the user equipment exceeds the first threshold or a determination that the wireless network has indicated to the user equipment that the data buffer at the wireless network has exceeded the second threshold, and wherein determining whether the data buffer in the user equipment exceeds the first threshold is performed in response to a current data transmission from the user equipment to a primary cell being an ongoing transmission or being previously initiated or started but not yet ongoing or being scheduled or triggered to start within a time period or immediately; and
receiving by the user equipment a response from the cell that the request to have the cell become the secondary cell for the user equipment was successful.

12. The apparatus of claim 11, wherein the at least one memory and the computer program code are configured, with the at least one processor, to cause the apparatus to perform operations further comprising detecting by the user equipment the cell meets one or more predefined conditions and wherein the performing the request for the cell to become a secondary cell is performed responsive to the detection the cell meets the one or more predefined conditions.

13. The apparatus of claim 12, wherein the at least one memory and the computer program code are configured, with the at least one processor, to cause the apparatus to perform detecting the cell meets one or more predefined conditions in response to a current data transmission from the user equipment to the primary cell being an ongoing transmission or being previously initiated or started but not yet ongoing or being scheduled or triggered to start within a time period or immediately.

14. The apparatus of claim 11, wherein the secondary cell is a primary secondary cell and the request for the cell to become the secondary cell for the user equipment is a request for the cell to become the primary secondary cell for the user equipment.

15. An apparatus, comprising:

at least one processor; and at least one memory including computer program code, the at least one memory and the computer program code configured, with the at least one processor, to cause the apparatus to perform operations comprising:

receiving, on a carrier at a cell in a wireless network, request by a user equipment to have the cell become a secondary cell for the user equipment; and performing, in response to the receiving and indicating, one or more actions to act as the secondary cell for the user equipment, wherein the one or more actions comprises;

sending by the cell a request for a secondary cell addition to a primary cell in the wireless network;

in response to receiving a primary secondary cell addition acknowledgement from the primary cell, performing the acting as the secondary cell for the user equipment; and sending by the cell one or more parameters for the secondary cell to the user equipment, the one or more parameters enabling the user equipment to access the secondary cell, wherein the parameters comprises at least one of common Radio Resource Control (RRC) configuration, dedicated RRC configuration, physical layer configuration, and Medium Access Control (MAC) configuration for the secondary cell; and indicating by the cell to the user equipment that the request to have the cell become a secondary cell for the user equipment was successful.

* * * * *